United States Patent
Mudd et al.

(10) Patent No.: US 7,387,447 B2
(45) Date of Patent: Jun. 17, 2008

(54) SECURE FIBER OPTIC CONNECTOR AND ADAPTER SYSTEMS

(75) Inventors: Ronald L. Mudd, Coppell, TX (US); Joshua D. Raker, Lewisville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/521,718

(22) Filed: Sep. 15, 2006

(65) Prior Publication Data

US 2008/0069501 A1 Mar. 20, 2008

(51) Int. Cl.
*G02B 6/38* (2006.01)
*G02B 6/36* (2006.01)
(52) U.S. Cl. .............................. 385/75; 385/53; 385/55; 385/56; 385/58; 385/60; 385/76; 385/77; 385/78
(58) Field of Classification Search ................... 385/75
See application file for complete search history.

(56) References Cited

U.S. PATENT DOCUMENTS

| 5,420,951 | A | * | 5/1995 | Marazzi et al. | ............... 385/75 |
| 5,647,043 | A | * | 7/1997 | Anderson et al. | ............. 385/78 |
| 5,719,977 | A | * | 2/1998 | Lampert et al. | ............. 385/60 |
| 5,923,805 | A | * | 7/1999 | Anderson et al. | ............. 385/86 |
| 6,960,025 | B2 | | 11/2005 | Gurreri | ........................ 385/58 |
| 2001/0026661 | A1 | * | 10/2001 | de Jong et al. | ............... 385/56 |
| 2004/0264877 | A1 | * | 12/2004 | Makhlin et al. | ............. 385/78 |
| 2005/0019010 | A1 | | 1/2005 | Kobayashi | .................... 386/83 |
| 2006/0063436 | A1 | | 3/2006 | Gurreri et al. | .............. 439/680 |

FOREIGN PATENT DOCUMENTS

| CA | 2441872 | 9/2003 |
| EP | 0616236 B1 | 11/1993 |
| EP | 0982609 B1 | 8/1998 |

* cited by examiner

*Primary Examiner*—Frank G. Font
*Assistant Examiner*—Ryan Lepisto
(74) *Attorney, Agent, or Firm*—Michael E. Carroll; Susan S. Wilks

(57) ABSTRACT

A secure fiber optic connector and adapter system including at least one connector including a first housing portion defining a first key slot and a second housing portion defining a second key slot independent of the first key slot, and at least one adapter including a first cavity for receiving the first housing portion and defining a first key therein for engaging with the first key slot, and a second cavity for receiving the second housing portion and defining a second key therein for engaging with the second key slot, wherein only a connector and an adapter having corresponding key slots and keys may mate. A secure fiber optic connector and adapter system for providing a level of secure access within a fiber optic network.

15 Claims, 13 Drawing Sheets

SECURE FIBER OPTIC CONNECTOR AND ADAPTER SYSTEMS

BACKGROUND OF THE INVENTION

1. Field of the Invention

The present invention relates generally to physical barriers for restricting access within secure fiber optic networks, and more specifically, to fiber optic connectors and associated adapters that include corresponding physical security features for restricting access to optical connections within a fiber optic network.

2. Technical Background of the Invention

Fiber optic networks have been developed that include numerous optical connection points at which optical fibers are interconnected. It is often common within organizations with large information networks to create multiple security levels to prevent sensitive information from being accessed by unauthorized users. Typically, these networks include fiber optic connectors that physically cannot be connected to an incorrect security level, thereby preventing unauthorized users from accessing sensitive information.

One example of a connector for secure access is described in U.S. Pat. No. 6,960,025 issued to Gurreri. The '025 patent describes a secure MT-RJ connector system that provides discriminating mating between plugs and receptacles by using a system of geometrically matched connector components which allow certain pairs of connectors to mate, but which prevent all other combinations of connectors to mate. The system includes a plurality of receptacles each having an inner surface with a first geometry, and a plurality of plugs each having a second geometry. The second geometry of a plug cooperates with at least one first geometry of a receptacle to allow the plug and the at least one receptacle to mate, and the second geometry of the plug physically interferes with all other second geometries of all of the other receptacles of the plurality or receptacles to prevent mating therewith. The '025 reference describes the first geometry as a key and the second geometry as a slot for receiving the key. The '025 reference further describes that each receptacle further includes ribs extending inward and the plug further includes slots for receiving the ribs. The ribs and rib-receiving slots effect pre-alignment of the connector and the second geometry interferes with all other non-corresponding first geometries to prevent mating.

While one example of a connector and receptacle system having a security feature is described above, there is an unresolved need for an alternative (or additional) secure fiber optic connector system for high density applications. There is an unresolved need for matching connectors and adapters, and in particular, adapters capable of receiving more than one small form factor connector to satisfy the demand for high density information networks. Desirable matching connectors and adapters may include multiple physical security features on each mating pair and the security features should be incapable of being defeated by unauthorized or other connectors.

SUMMARY OF THE INVENTION

In one embodiment, the present invention describes fiber optic connectors and adapters that include matching physical security features for restricting optical connection access in a fiber optic network. The physical security features allow a connector to mate with an adapter including the matching security structure, while preventing non-matching connectors from mating. In various embodiments, the connectors define a first key slot defined by an outer surface of a connector housing and a second key slot defined by a latch attachment portion of the connector. In various embodiments, the matching adapters define a first protruding key on an inner surface of the adapter for engaging with the first key slot of the connector, and a second protruding key on another adapter surface for engaging with the second key slot of the connector. The connectors may optionally include a standard exclusion feature for preventing the connectors from being inserted into a competing adapter. Thus, the present invention provides a first level of security that is standard among the connectors and a second level of security that allows only the mating of specific connectors with matched adapters.

In another embodiment, the present invention provides fiber optic connectors and adapters for creating a secure network. The connectors include a first key slot that is defined at a predetermined one of four corners defined by the connector housing, and include a second key slot defined by a predetermined left or right side of a latch attachment portion. The four potential locations of the first key slot and the two potential locations of the second key slot provide eight different matched keying combinations. By altering the location of the physical security features, multiple secure connectors are created. In an alternative embodiment, the second key slot may be defined by a portion of the latch that is activated to secure the connector within an adapter and withdraw the connector from the adapter.

In another embodiment, the present invention provides a secure LC fiber optic connector and adapter system for use within a fiber optic network. Each LC connector includes a connector housing defining an opening therethrough about a longitudinal axis of the housing. A ferrule assembly is positioned and maintained within one end of the opening and presented for optical connection with a mating ferrule. In one embodiment, each ferrule mates with a ferrule of like configuration through the adapter. The connector housing further defines a first key slot recessed within a predetermined portion of the outer surface of the housing about the connective end of the connector. The key slot is engaged by a key of a matching adapter during connector insertion. The connector further defines a second key slot about a latch portion that is engaged by a second key of the adapter during connector insertion. The keys in the adapter prevent a connector that does not have matching key slots from latching into the adapter or transmitting information.

In another embodiment, the present invention provides secure connector and adapter families that include a first key slot defined by the connector main body, wherein the location of the connector first key slot and a corresponding adapter key can be relocated to each of the four corners of the connector main body to create four secure connector families. Additionally, the main body of the connector defines a second key slot that prevents connectors without the slot to latch into the adapter or transmit information. By locating the second slot and the adapter key on the left or right side of the connector and adapter, even more secure connector families can be created by alternating these features. Additionally, a rib on the bottom of all of the connectors prevents secure connectors from being latched into a non-secure adapter. To facilitate the user in correctly and quickly identifying the associated secure adapter, the connector and adapter may have matching colors or may be otherwise marked for visual identification.

Additional features and advantages of the present invention will be set forth in the detailed description which follows, explaining the principles and operations thereof, and will also be readily apparent to those of ordinary skill in the art from the description and/or recognized by practicing the invention as described. It is to be understood that the general description above and the detailed description which follows present exemplary embodiments of the invention, which are intended to provide an overview and framework for understanding the nature and character of the invention as it is claimed. The accompanying drawings are incorporated into and constitute a part of this specification, illustrating and further highlighting the exemplary embodiments of the present invention.

DETAILED DESCRIPTION OF THE PREFERRED EMBODIMENTS

Reference will now be made in detail to the preferred embodiments of the present invention, examples of which are illustrated in the accompanying drawings. Whenever possible, like reference numbers will be used to refer to like components or parts. While specific embodiments of geometries for physical security for fiber optic connectors is shown, it is envisioned that alternative geometries and security feature positions may be used to perform similar functions. In addition, while secure LC connectors and corresponding adapters are shown throughout the various figures, it is envisioned that the concepts and geometries may be applied to any fiber optic connector including, but not limited to, LC, SC, FC, MT-RJ, MT and like connectors.

Figure 1:
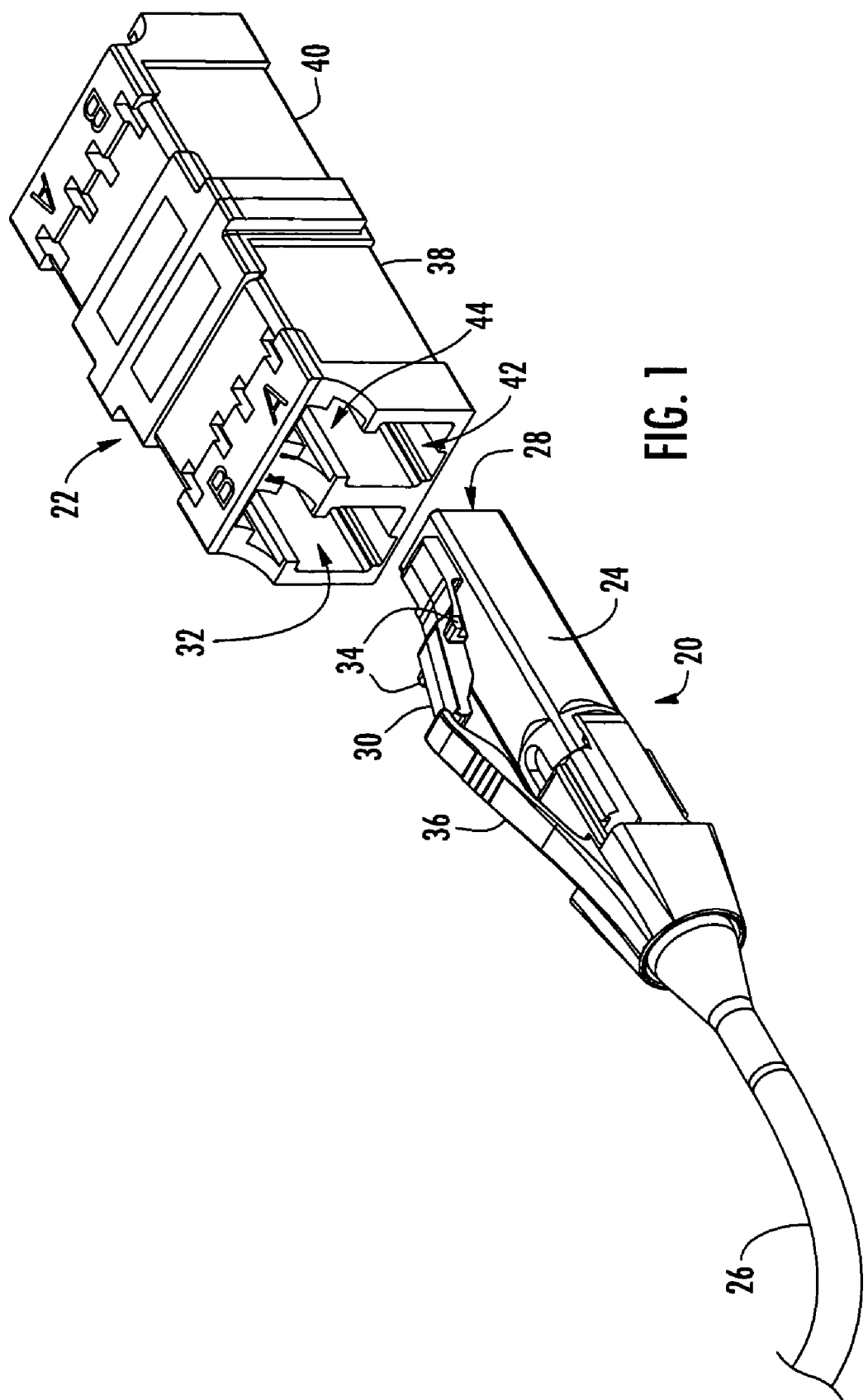
FIG. 1 is a perspective view of a secure fiber optic connector and adapter matching pair shown with the connector disengaged from the adapter.

Referring now to FIG. 1, an LC connector 20 and corresponding adapter 22 are shown. The connector 20 defines at least a first key slot and a second key slot that are engaged by a first key and a second key of the adapter 22, respectively. The key and key slot geometries function as physical security features for allowing only components having coordinating features to mate and transmit information, while preventing non-coordinating components from mating and transmitting information, thus providing a level of security for the exchange of information within a fiber optic network. The connector 20 includes a main body 24, also referred to herein as a "housing". The connector 20 is shown mounted upon a fiber optic cable 26. Although not shown, it is known in the art that LC connectors typically hold a single fiber in about a 1.25 mm ceramic ferrule. An LC connector is one example of a small form factor connector suitable for use in the present invention. The connector main body 24 may be made of molded plastic and features a square font connective end 28. An RJ-style latch 30, similar to that of an MT-RJ phone jack, on the top of the connector 20 provides easy, repeatable connections. Although only one LC connector 20 is shown being inserted into a duplex adapter 22, two LC connectors may be clipped or otherwise maintained together to form a duplex LC. The small size and push-in connections of LC connectors make them ideal for use in high-density applications desired by companies with large information networks.

The adapter 22 may also be made from molded plastic and defines at least one connector opening 32 for receiving at least one connector 20. The adapter 22 as shown includes two substantially similar, and in some embodiments identical, components 38, 40 arranged back-to-back, depending upon the types of connectors desired to be mated. The adapter 22 defines a through passage for allowing mating ferrules to come into physical contact. The adapter opening 32 includes a first opening portion 42, also referred to herein as a "cavity", "cavity portion" or other hollow space within the adapter, for accepting the connector main body 24 and a second opening potion 44, or cavity, for accepting the latch 30. The latch 30 defines ears 34 that seat within a slot within the adapter 22 to snap and maintain the connector in place on insertion. The connector 20 further includes an activating trigger 36 for activating the latch 30 and preventing snagging. The adapter 22 may be mounted within a patch panel, connector housing, distribution frame, or other structure. To facilitate a user in correctly and quickly identifying the associated secure adapter, the connector and adapter may have matching colors or may be otherwise marked for visual identification. The colors may correspond to specific keyed positions.

Figure 2A:
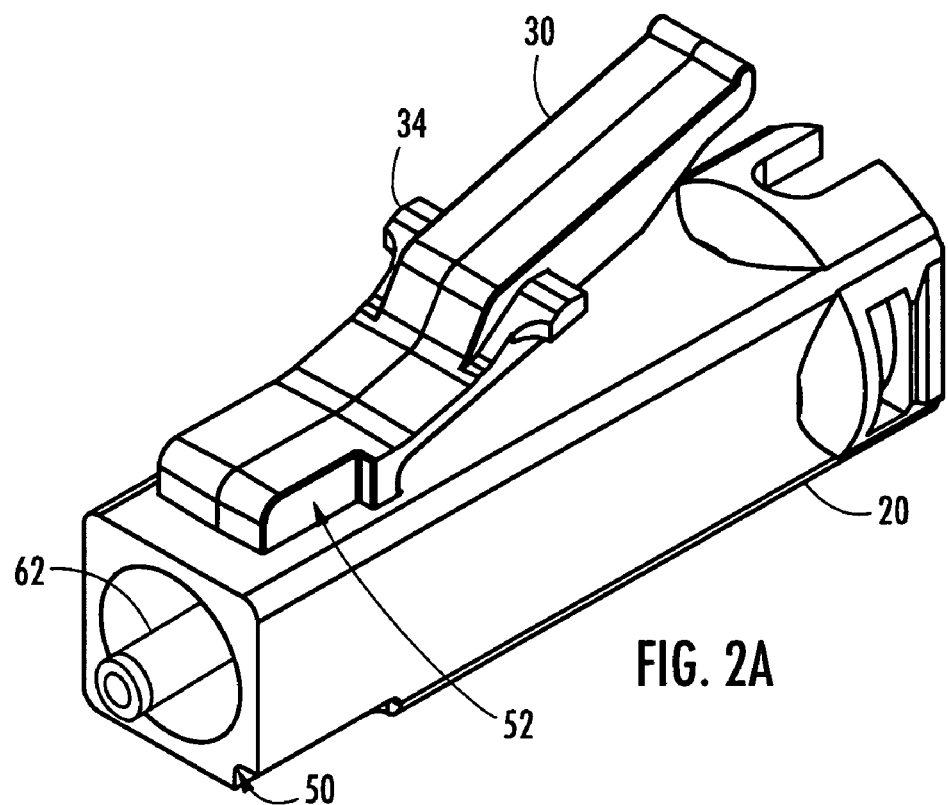
FIGS. 2A-C are various views of one secure optical connection pair including first and second security features at predetermined positions.
Figure 2B:
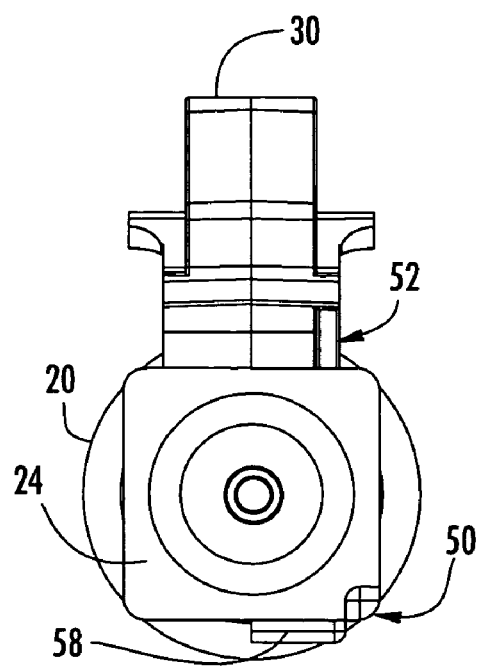
Figure 2C:
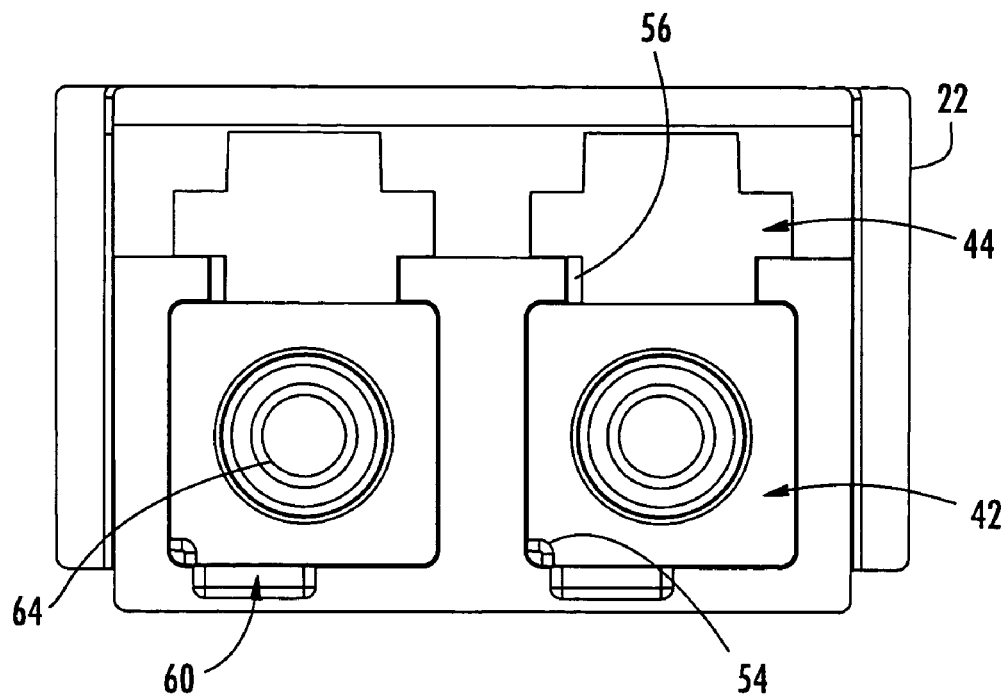

Referring to FIGS. 2A-C, one embodiment of a connector 20 and adapter 22 pair with cooperating geometries for physical security are shown. Referring specifically to FIGS. 2A-B, the connector 20 defines a first key slot 50 recessed on the main body 24 of the connector 20, and a second key slot 52 positioned about the latch supporting portion. Looking head-on, the first key slot 50 is positioned at the bottom-right corner and the second key slot 52 is positioned on the right side of the latch support structure. Referring specifically to FIG. 2C, the first key 54 protrudes into the first portion 42 of the adapter 22, and the second key 56 protrudes into the second portion 44. Looking head-on, the first key 54 is positioned at the bottom-left corner and the second key 56 is positioned on the left side. Thus, as the connector 20 and the adapter 22 mate, the first and second keys 54, 56 are received within the first and second key slots 50, 52 respectively to provide a level of security. The first and second keys 54, 56 prevent a connector that does not include the corresponding key slots 50, 52 from latching into the adapter 22 or transmitting information. The connector 20 may further include a connector standard exclusion feature, or rib 58, positioned about the bottom of all of the secure connectors of the present invention that is received within a rib slot 60 of the adapter 22 to prevent a "secure" connector from being latched into a "non-secure" adapter. The ferrule 62 is received within the alignment structure 64 of the adapter 22. The adapter 22 may further include mounting features for mounting within a connector housing or other structure.

Figure 3A:
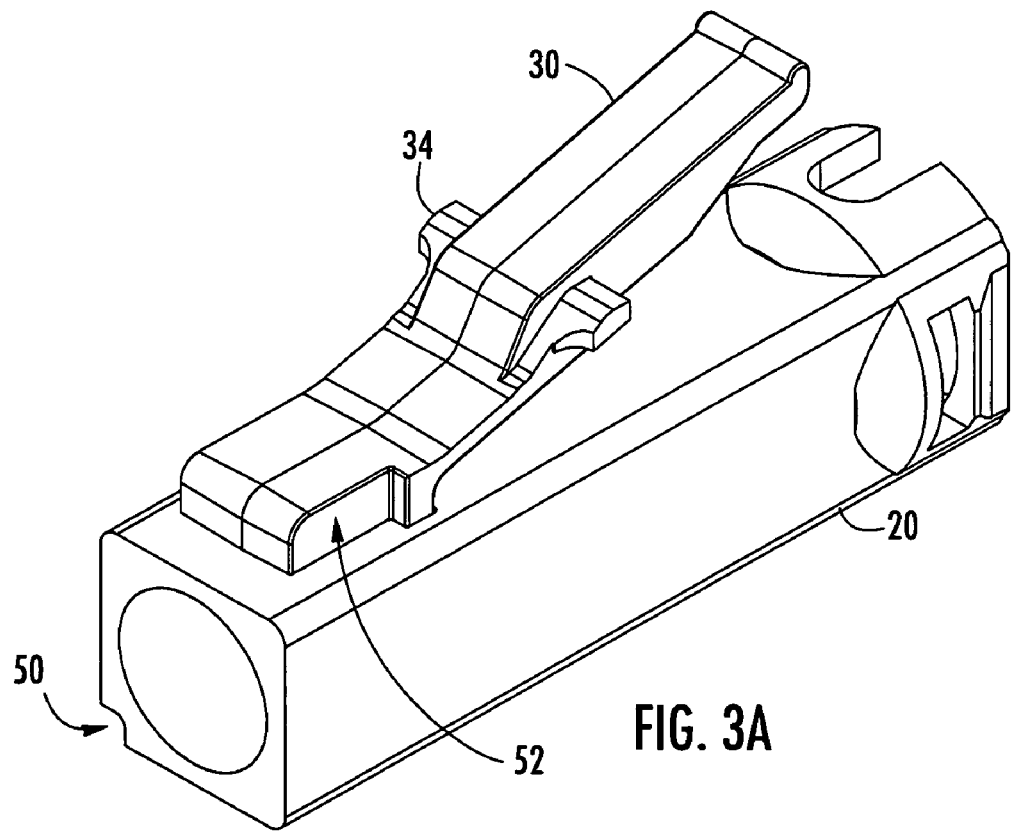
FIGS. 3A-C are various views of another secure optical connection pair including first and second security features at predetermined positions.
Figure 3B:
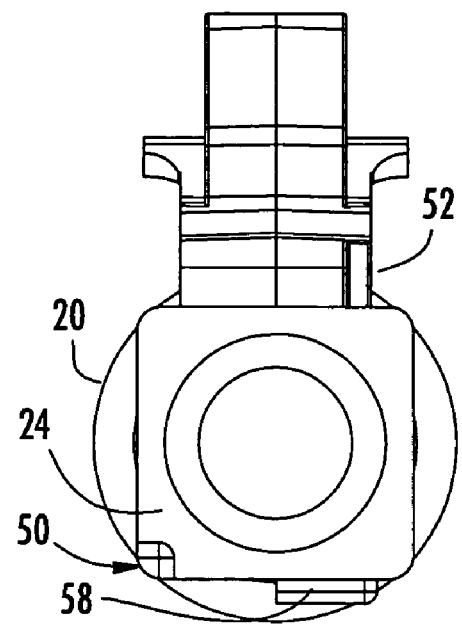
Figure 3C:
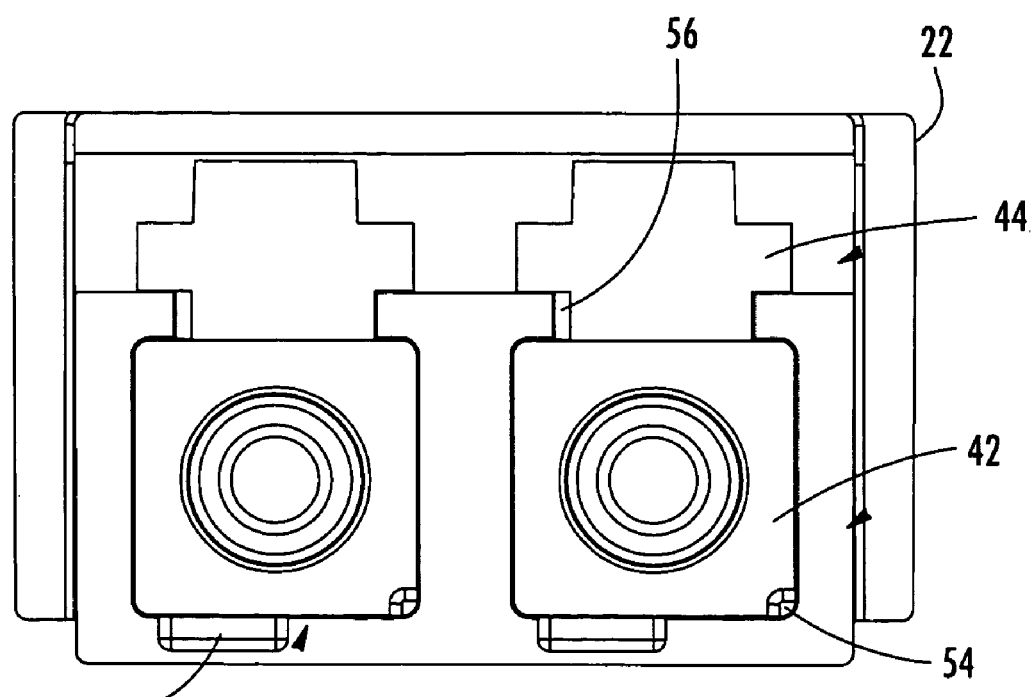

Referring to FIGS. 3A-C, another embodiment of a connector 20 and adapter 22 pair with cooperating geometries for physical security are shown. Referring specifically to FIGS. 3A-B, the connector 20 defines a first key slot 50 recessed on the main body 24 of the connector 20, and a second key slot 52 positioned about the latch supporting portion. Looking head-on, the first key slot 50 is positioned at the bottom-left corner and the second key slot 52 is positioned on the right side of the latch support structure. Referring specifically to FIG. 3C, the first key 54 protrudes into the first portion 42 of the adapter 22, and the second key 56 protrudes into the second portion 44. Looking head-on, the first key 54 is positioned at the bottom-right corner and the second key 56 is positioned on the left side. Thus, as the connector 20 and the adapter 22 mate, the first and second keys 54, 56 are received within the first and second key slots 50, 52 respectively to provide a level of security. The connector 20 may further include a connector standard rib 58 positioned about the bottom of all of the secure connectors of the present invention that is received within a rib slot 60 of the adapter 22 to prevent a "secure" connector from being latched into a "non-secure" adapter.

Figure 4A:
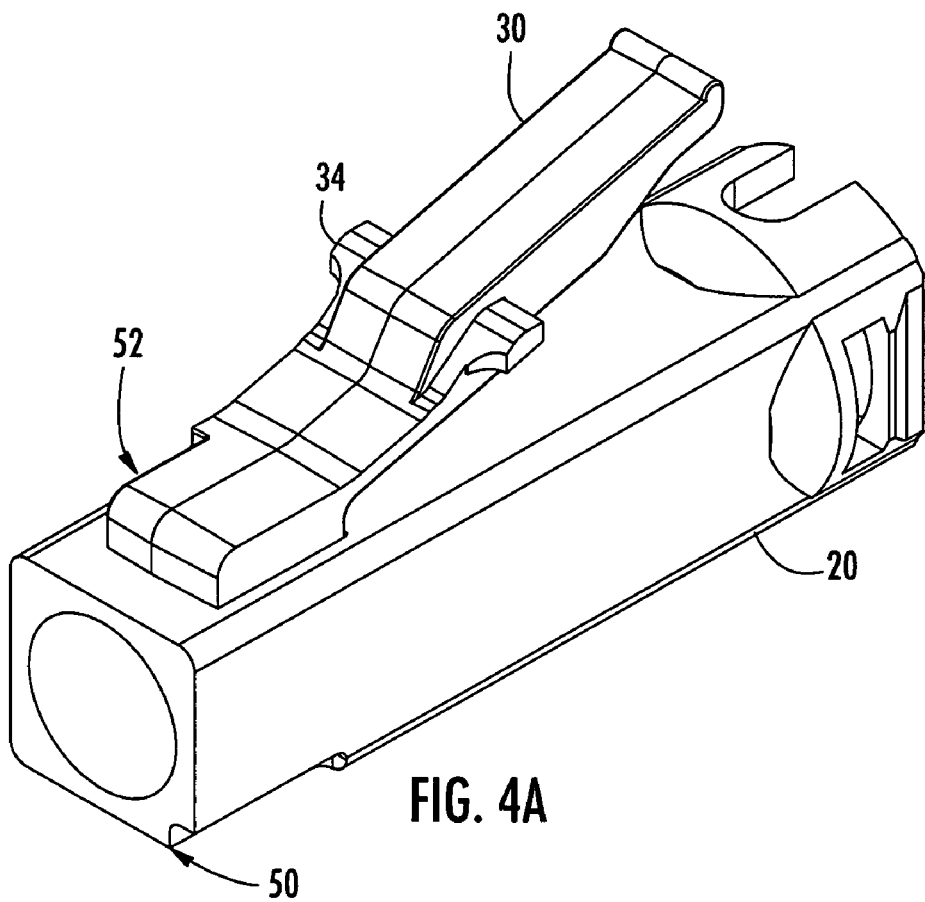
FIGS. 4A-C are various views of another secure optical connection pair including first and second security features at predetermined positions.
Figure 4B:
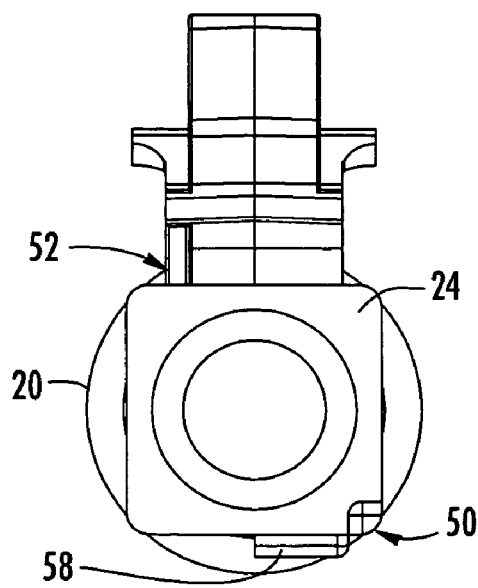
Figure 4C:
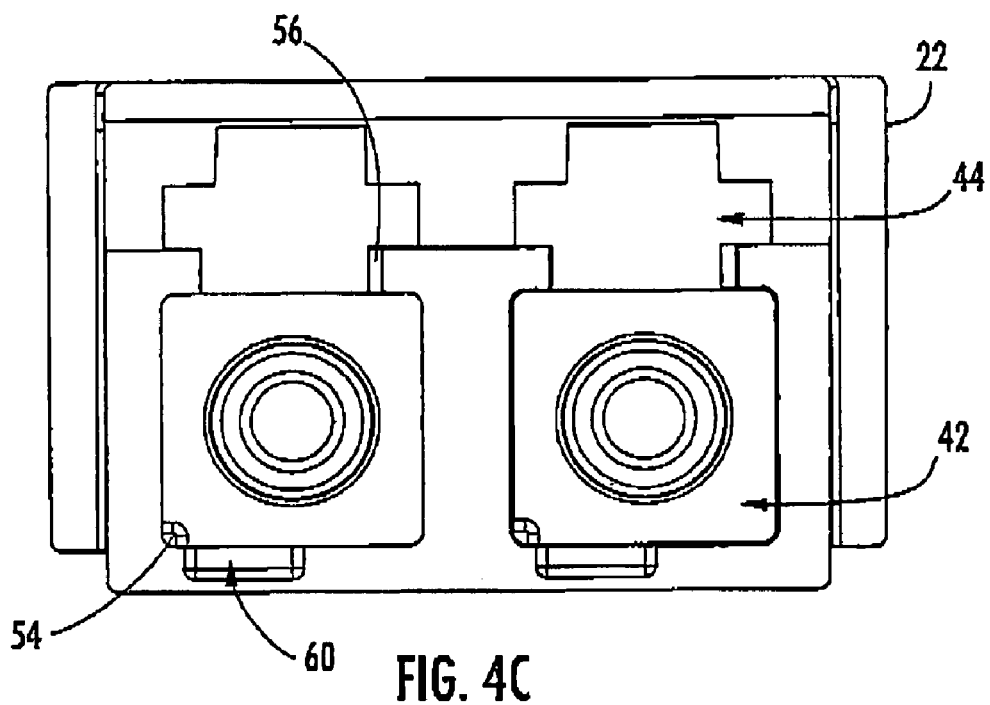

Referring to FIGS. 4A-C, another embodiment of a connector 20 and adapter 22 pair with cooperating geometries for physical security are shown. Referring specifically to FIGS. 4A-B, the connector 20 defines a first key slot 50 recessed on the main body 24 of the connector 20, and a second key slot 52 positioned about the latch supporting portion. Looking head-on, the first key slot 50 is positioned at the bottom-right corner and the second key slot 52 is positioned on the left side of the latch support structure. Referring specifically to FIG. 4C, the first key 54 protrudes into the first portion 42 of the adapter 22, and the second key 56 protrudes into the second portion 44. Looking head-on, the first key 54 is positioned at the bottom-left corner and the second key 56 is positioned on the right side. Thus, as the connector 20 and the adapter 22 mate, the first and second keys 54, 56 are received within the first and second key slots 50, 52 respectively to provide a level of security. The connector 20 may further include a connector standard rib 58 positioned about the bottom of all of the secure connectors of the present invention that is received within a rib slot 60 of the adapter 22 to prevent a "secure" connector from being latched into a "non-secure" adapter.

Figure 5A:
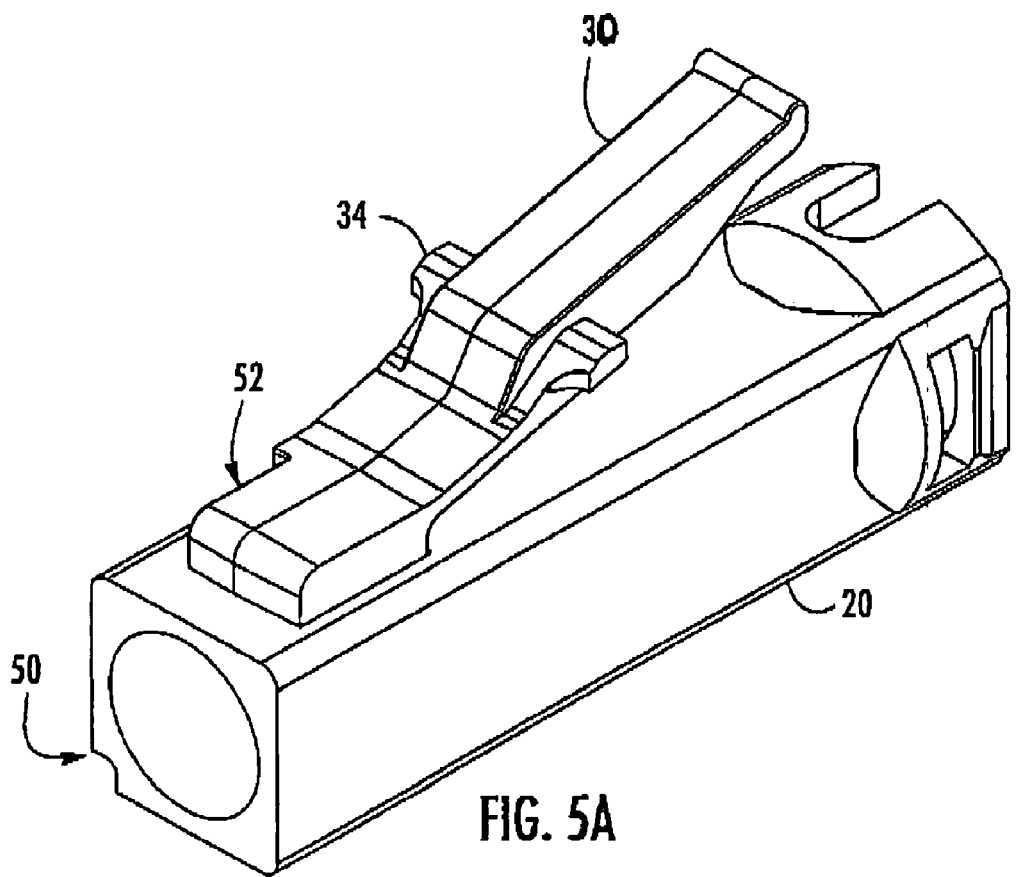
FIGS. 5A-C are various views of another secure optical connection pair including first and second security features at predetermined positions.
Figure 5B:
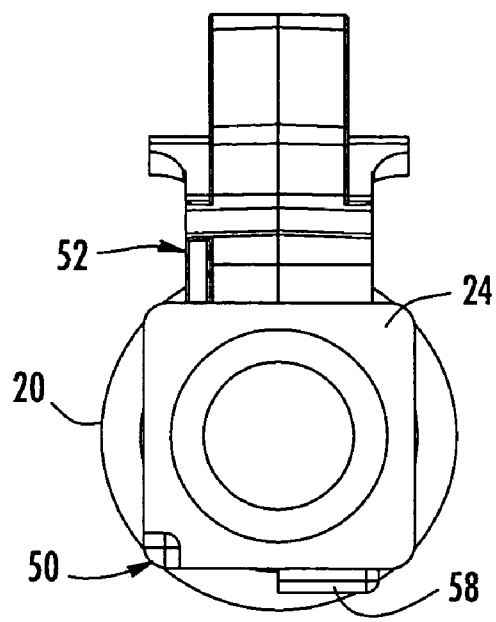
Figure 5C:
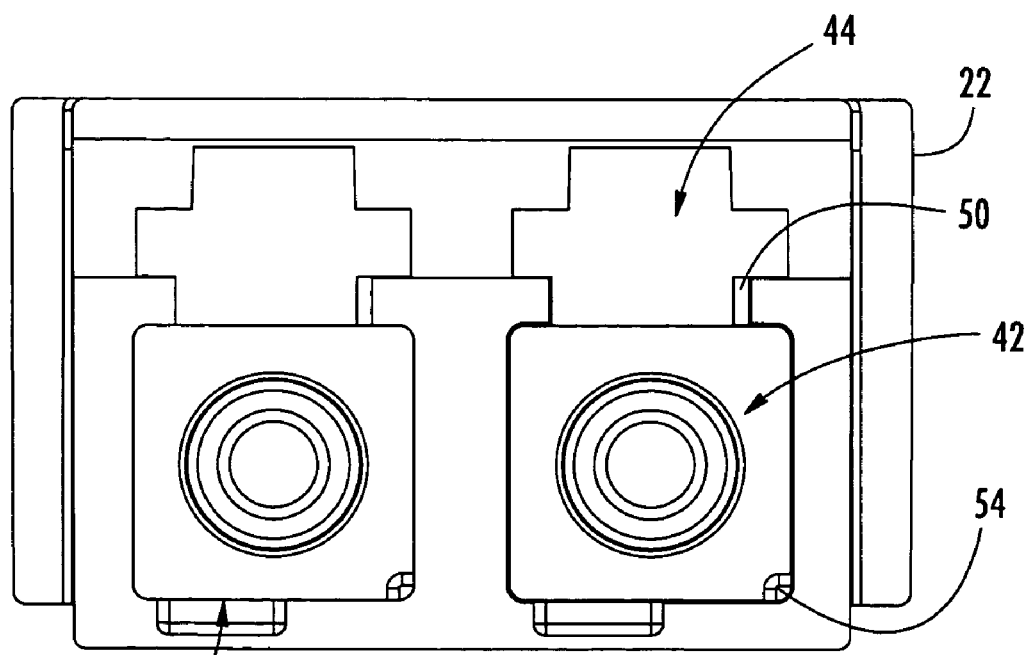

Referring to FIGS. 5A-C, another embodiment of a connector 20 and adapter 22 pair with cooperating geometries for physical security are shown. Referring specifically to FIGS. 5A-B, the connector 20 defines a first key slot 50 recessed on the main body 24 of the connector 20, and a second key slot 52 positioned about the latch supporting portion. Looking head-on, the first key slot 50 is positioned at the bottom-left corner and the second key slot 52 is positioned on the left side of the latch support structure. Referring specifically to FIG. 5C, the first key 54 protrudes into the first portion 42 of the adapter 22, and the second key 56 protrudes into the second portion 44. Looking head-on, the first key 54 is positioned at the bottom-right corner and the second key 56 is positioned on the right side. Thus, as the connector 20 and the adapter 22 mate, the first and second keys 54, 56 are received within the first and second key slots 50, 52 respectively to provide a level of security. The connector 20 may further include a connector standard rib 58 positioned about the bottom of all of the secure connectors of the present invention that is received within a rib slot 60 of the adapter 22 to prevent a "secure" connector from being latched into a "non-secure" adapter.

Figure 6A:
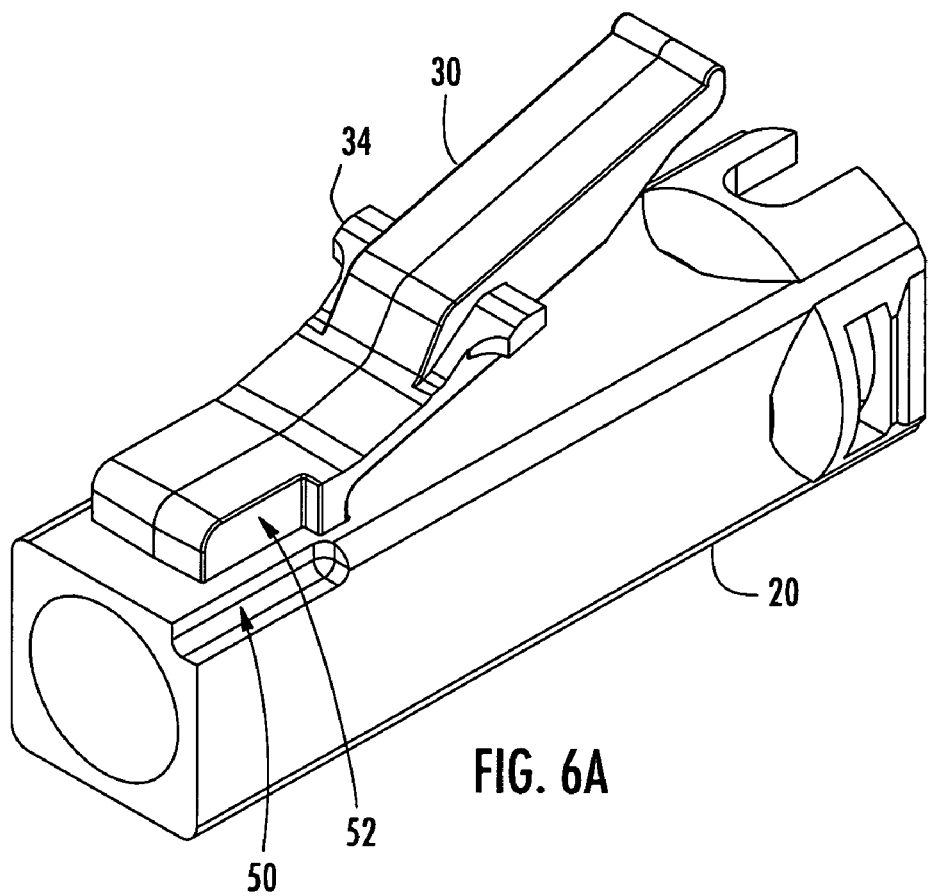
FIGS. 6A-C are various views of another secure optical connection pair including first and second security features at predetermined positions.
Figure 6B:
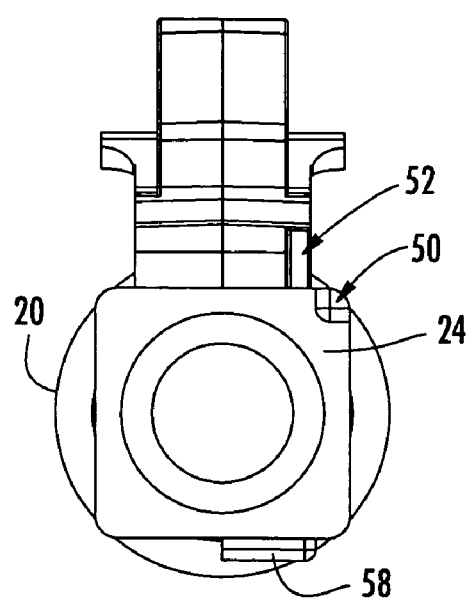
Figure 6C:
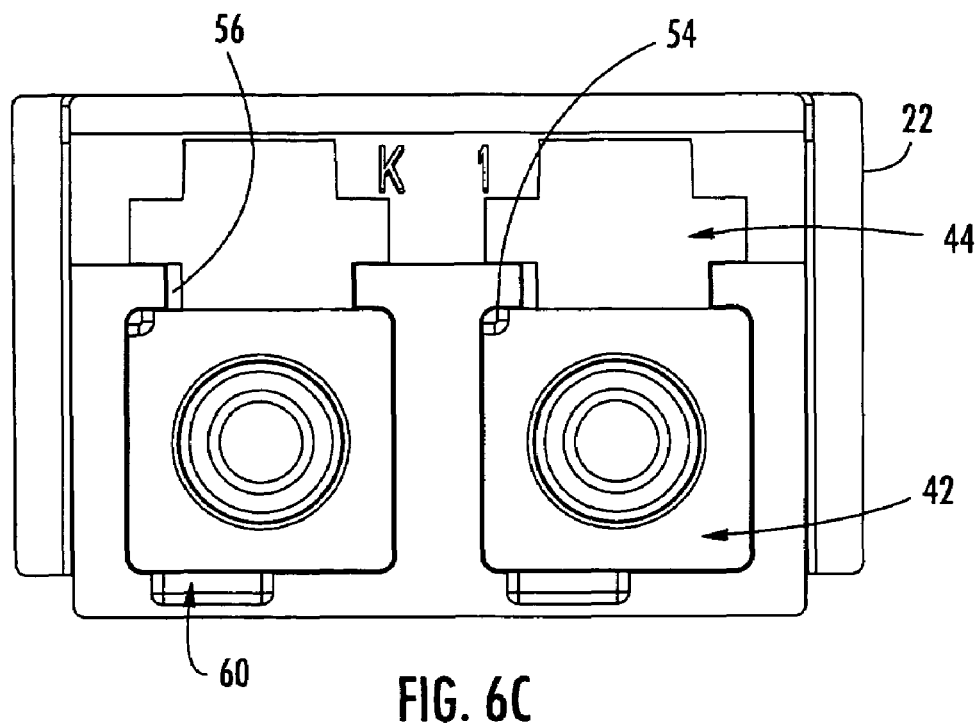

Referring to FIGS. 6A-C, another embodiment of a connector 20 and adapter 22 pair with cooperating geometries for physical security are shown. Referring specifically to FIGS. 6A-B, the connector 20 defines a first key slot 50 recessed on the main body 24 of the connector 20, and a second key slot 52 positioned about the latch supporting portion. Looking head-on, the first key slot 50 is positioned at the upper-right corner and the second key slot 52 is positioned on the right side of the latch support structure. Referring specifically to FIG. 6C, the first key 54 protrudes into the first portion 42 of the adapter 22, and the second key 56 protrudes into the second portion 44. Looking head-on, the first key 54 is positioned at the upper-left corner and the second key 56 is positioned on the left side. Thus, as the connector 20 and the adapter 22 mate, the first and second keys 54, 56 are received within the first and second key slots 50, 52 respectively to provide a level of security. The connector 20 may further include a connector standard rib 58 positioned about the bottom of all of the secure connectors of the present invention that is received within a rib slot 60 of the adapter 22 to prevent a "secure" connector from being latched into a "non-secure" adapter.

Figure 7A:
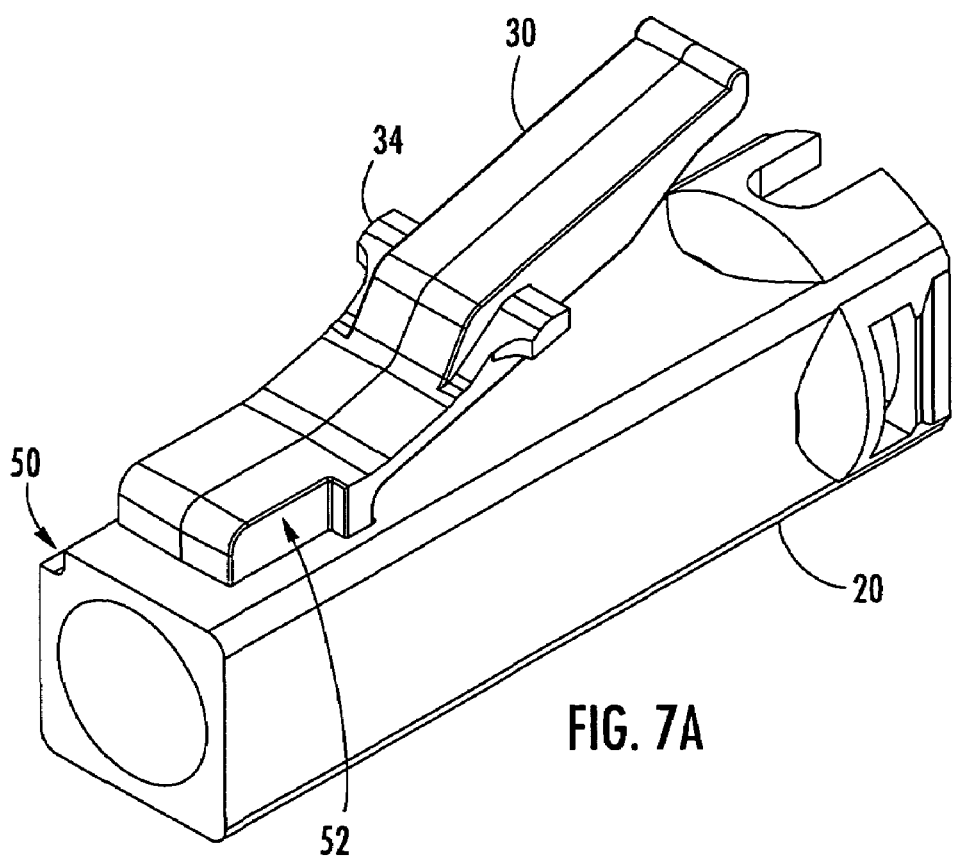
FIGS. 7A-C are various views of another secure optical connection pair including first and second security features at predetermined positions.
Figure 7B:
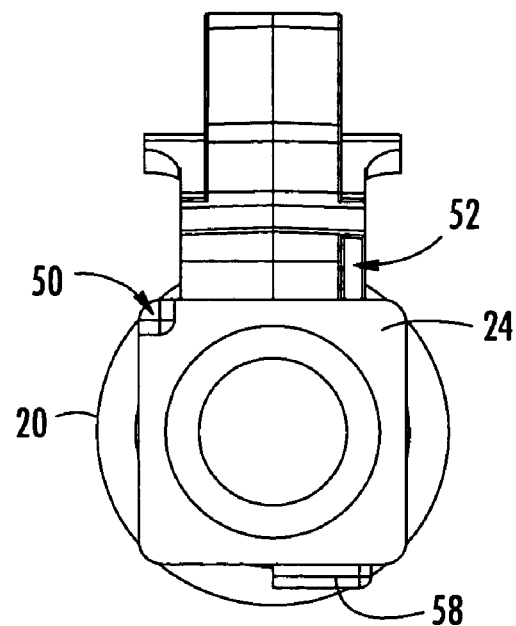
Figure 7C:
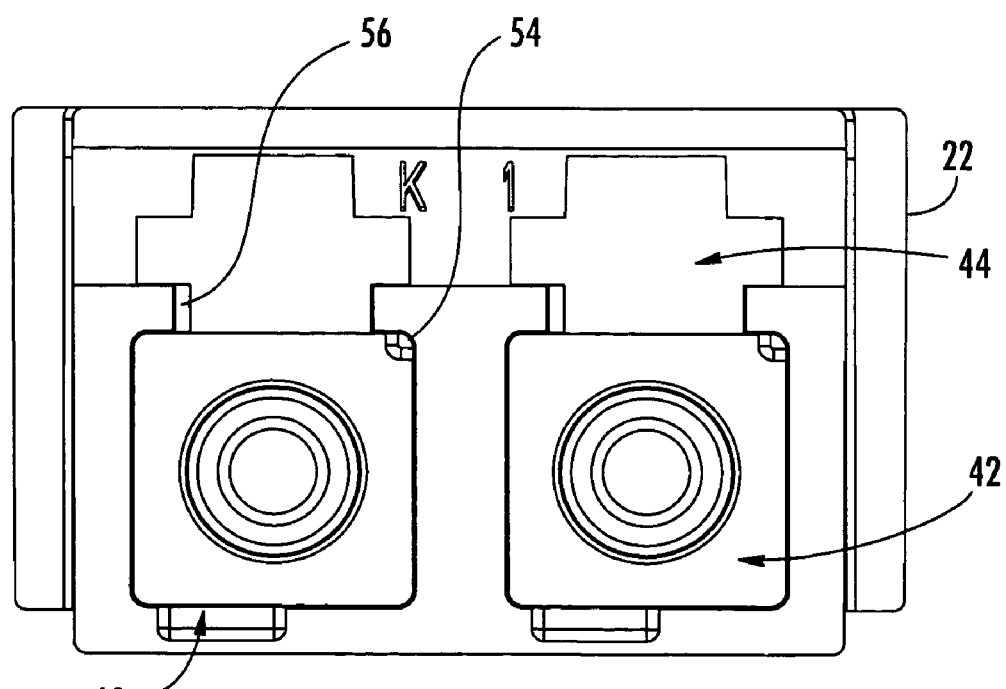

Referring to FIGS. 7A-C, another embodiment of a connector 20 and adapter 22 pair with cooperating geometries for physical security are shown. Referring specifically to FIGS. 7A-B, the connector 20 defines a first key slot 50 recessed on the main body 24 of the connector 20, and a second key slot 52 positioned about the latch supporting portion. Looking head-on, the first key slot 50 is positioned at the upper-left corner and the second key slot 52 is positioned on the right side of the latch support structure. Referring specifically to FIG. 7C, the first key 54 protrudes into the first portion 42 of the adapter 22, and the second key 56 protrudes into the second portion 44. Looking head-on, the first key 54 is positioned at the upper-right corner and the second key 56 is positioned on the left side. Thus, as the connector 20 and the adapter 22 mate, the first and second keys 54, 56 are received within the first and second key slots 50, 52 respectively to provide a level of security. The connector 20 may further include a connector standard rib 58 positioned about the bottom of all of the secure connectors of the present invention that is received within a rib slot 60 of the adapter 22 to prevent a "secure" connector from being latched into a "non-secure" adapter.

Figure 8A:
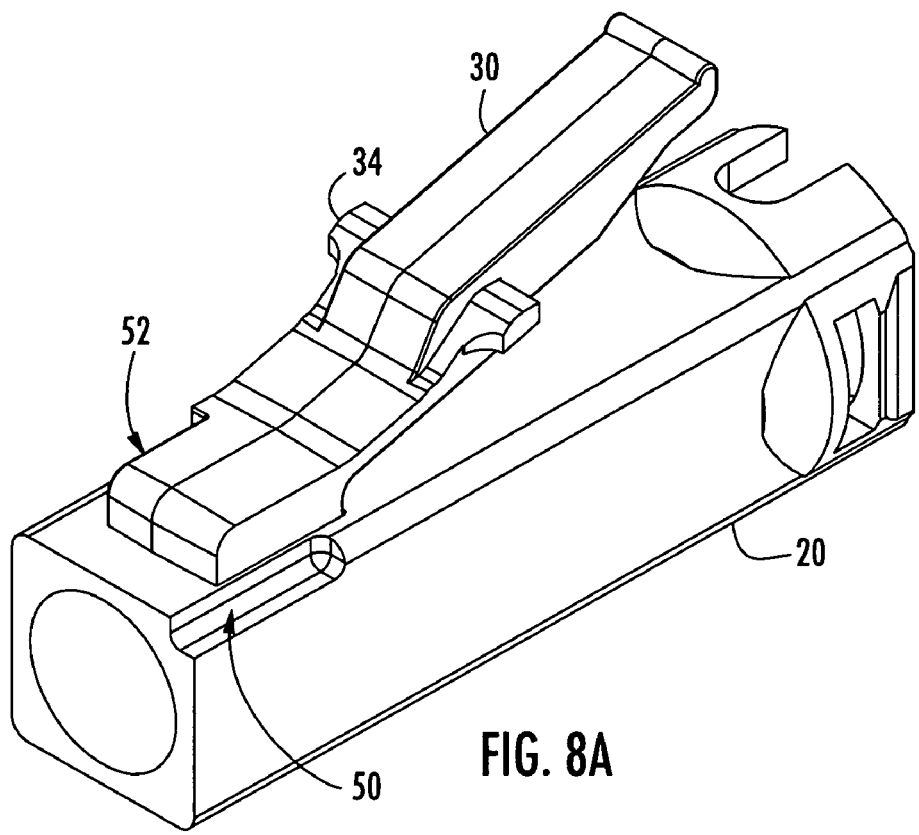
FIGS. 8A-C are various views of another secure optical connection pair including first and second security features at predetermined positions.
Figure 8B:
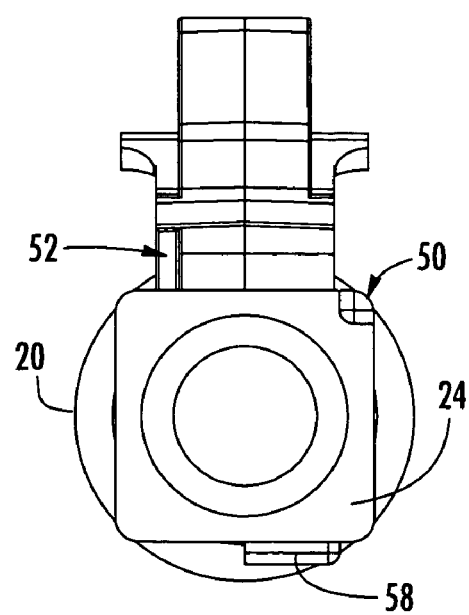
Figure 8C:
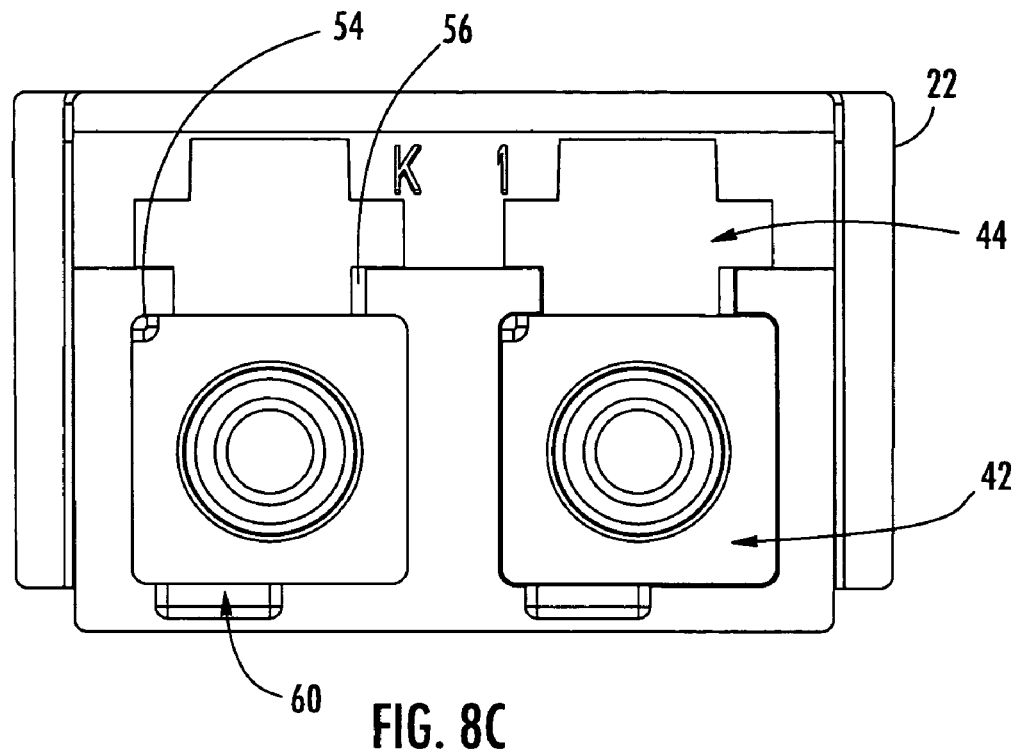

Referring to FIGS. 8A-C, another embodiment of a connector 20 and adapter 22 pair with cooperating geometries for physical security are shown. Referring specifically to FIGS. 8A-B, the connector 20 defines a first key slot 50 recessed on the main body 24 of the connector 20, and a second key slot 52 positioned about the latch supporting portion. Looking head-on, the first key slot 50 is positioned at the upper-right corner and the second key slot 52 is positioned on the left side of the latch support structure. Referring specifically to FIG. 8C, the first key 54 protrudes into the first portion 42 of the adapter 22, and the second key 56 protrudes into the second portion 44. Looking head-on, the first key 54 is positioned at the upper-left corner and the second key 56 is positioned on the right side. Thus, as the connector 20 and the adapter 22 mate, the first and second keys 54, 56 are received within the first and second key slots 50, 52 respectively to provide a level of security. The connector 20 may further include a connector standard rib 58 positioned about the bottom of all of the secure connectors of the present invention that is received within a rib slot 60 of the adapter 22 to prevent a "secure" connector from being latched into a "non-secure" adapter.

Figure 9A:
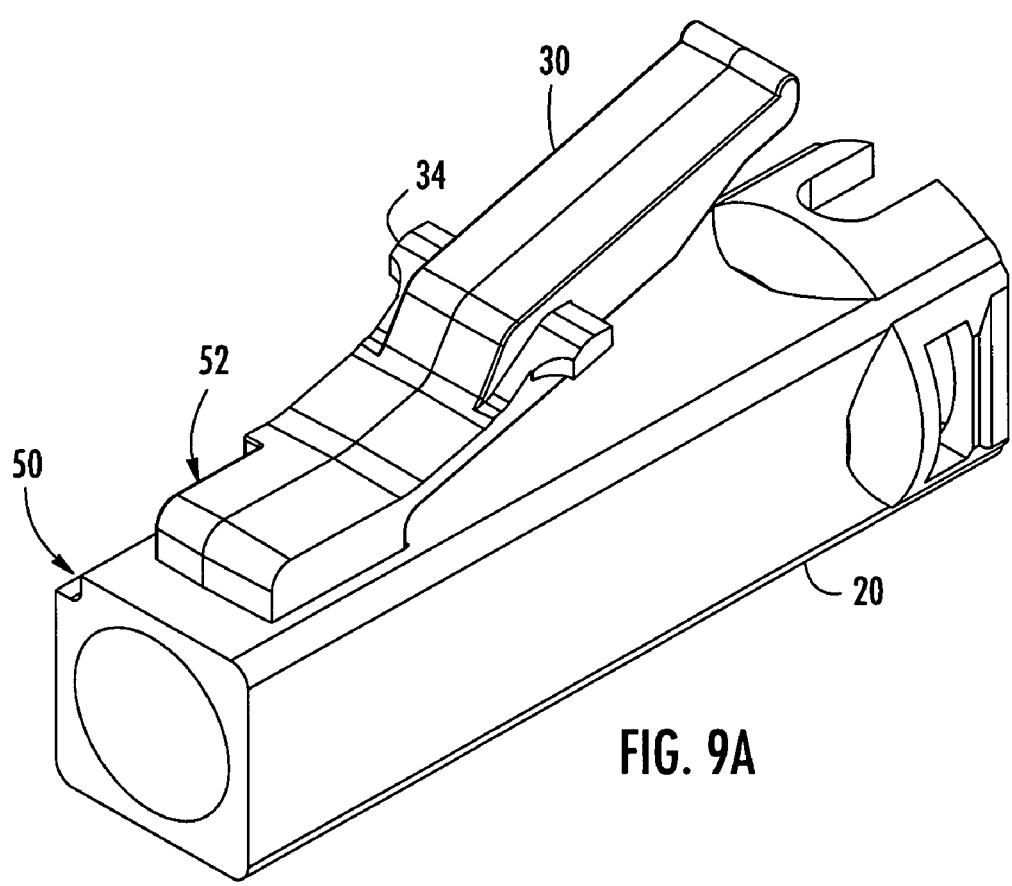
FIGS. 9A-C are various views of another secure optical connection pair including first and second security features at predetermined positions.
Figure 9B:
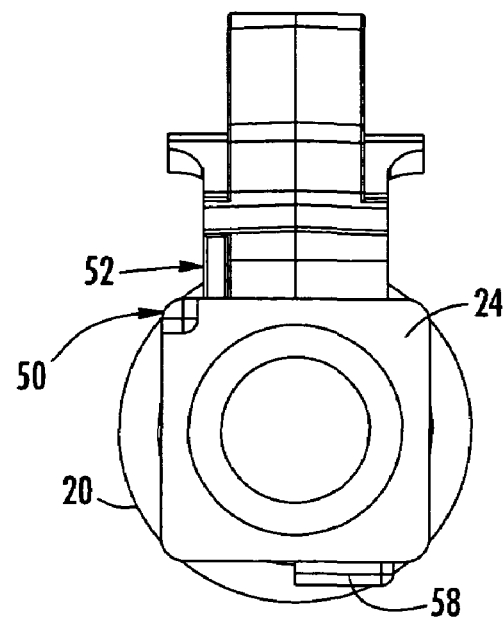
Figure 9C:
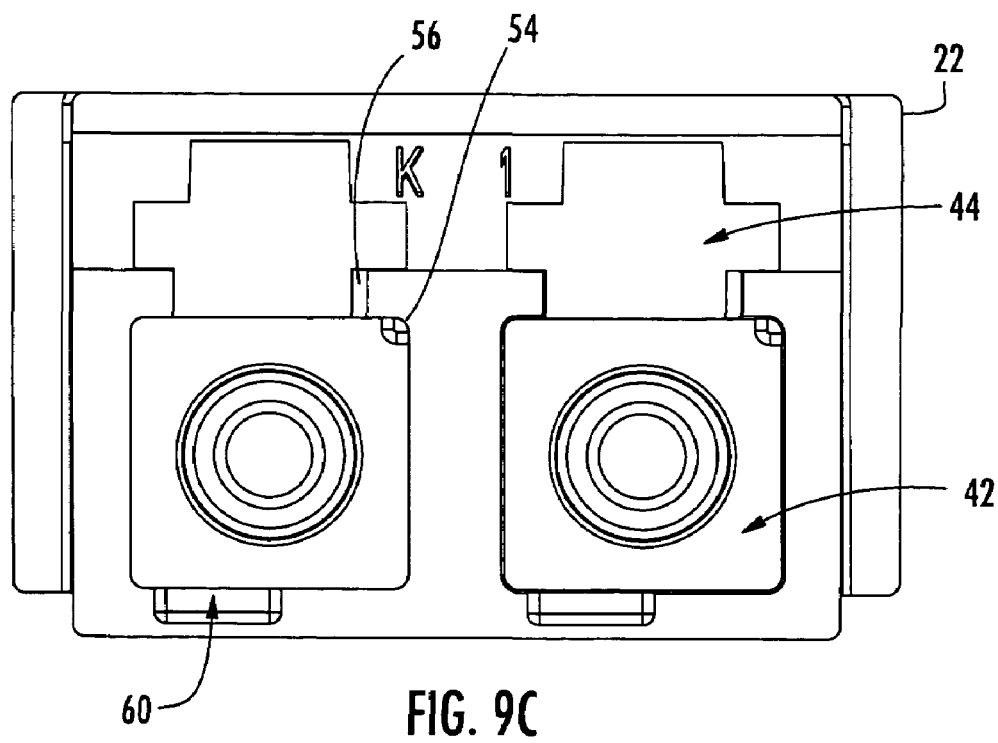

Referring to FIGS. 9A-C, another embodiment of a connector 20 and adapter 22 pair with cooperating geometries for physical security are shown. Referring specifically to FIGS. 9A-B, the connector 20 defines a first key slot 50 recessed on the main body 24 of the connector 20, and a second key slot 52 positioned about the latch supporting portion. Looking head-on, the first key slot 50 is positioned at the upper-left corner and the second key slot 52 is positioned on the left side of the latch support structure. Referring specifically to FIG. 9C, the first key 54 protrudes into the first portion 42 of the adapter 22, and the second key 56 protrudes into the second portion 44. Looking head-on, the first key 54 is positioned at the upper-right corner and the second key 56 is positioned on the right side. Thus, as the connector 20 and the adapter 22 mate, the first and second keys 54, 56 are received within the first and second key slots 50, 52 respectively to provide a level of security. The connector 20 may further include a connector standard rib 58 positioned about the bottom of all of the secure connectors of the present invention that is received within a rib slot 60 of the adapter 22 to prevent a "secure" connector from being latched into a "non-secure" adapter.

The connectors and corresponding adapters described herein may be used within information networks as a security level to prevent sensitive information from being accessed by unauthorized users. The first key slot may be located to each of the four corners of the connector main body, thus creating four "secure" connector families. Additionally, by locating the second key slot on the left side of the right side of the connector even more "secure" connector families are created. The combination of first and second key slot positions provides for a total of eight "secure" connector families. The connectors as shown are LC epoxy and polish-type connectors, however, the connectors may be mechanical splice connectors. While duplex adapters are shown throughout, simplex or multiple adapters are envisioned.

While various embodiments of secure connectors are shown, it is apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A secure fiber optic connector and adapter system, comprising:
    at least one connector including a first housing portion defining a first key slot recessed within a corner of a connector main body, the first key slot having a depth structured and arranged to receive a first key, wherein the depth of the first key slot is less than a length of the connector main body, and a second housing portion comprising a latch defining a second key slot independent of the first key slot; and
    at least one adapter including a first cavity portion for receiving the first housing portion and defining a first key therein for engaging with the first key slot, the first key having a length structured and arranged to fit into the first key slot, and a second cavity portion for receiving the second housing portion and defining a second key therein for engaging with the second key slot.

2. The system of claim 1, wherein only a connector and an adapter having corresponding key slots and keys may mate.

3. The system of claim 1, wherein the at least one connector further includes at least one standard exclusion feature and the at least one adapter defines a rib slot for receiving the at least one standard exclusion feature.

4. The system of claim 1, wherein a corresponding the at least one connector and the at least one adapter have matching colors.

5. The system of claim 1, wherein the at least one connector is an LC connector.

6. A secure fiber optic connector and adapter system; comprising:
    at least one connector including at least a connector main body and a latch, the connector main body defining a square-shaped end and a first key slot recessed in a corner of the square-shaped end, wherein the first key slot does not extend along an entire length of the connector main body, and the latch defining a second key slot recessed therein; and
    at least one adapter defining a first key for engaging the first key slot and a second key for engaging the second key slot during engagement of the at least connector with the at least one adapter.

7. The system of claim 6, wherein the at least one connector further includes at least one standard exclusion feature and the at least one adapter defines a rib slot for receiving the at least one standard exclusion feature upon engagement.

8. The system of claim 6, wherein a corresponding the at least one connector and the at least one adapter have matching colors.

9. The system of claim 6, wherein the at least one connector is an LC connector.

10. A secure fiber optic connector and adapter system, comprising:
    a plurality of adapters, each adapter comprising a cavity having an inner surface comprising at least a first key and a second key, at least two or more adapters having different first and second key positions; and
    a plurality of connectors, each connector comprising a housing having a ferrule maintained within the housing, the housing comprising a first key slot recessed within a corner of the housing to receive the first key, the first key slot having a length which is less than an entire length of the housing, the housing also comprising a second key slot recessed within a latch to receive the second key, the second key slot having a length, at least two or more connectors having different first and second key slot positions;
    wherein a particular connector of said plurality of connectors having particular first and second key slots positions and lengths, and a particular adapter of said plurality of adapters having particular first and second key positions mates such that the first and the second keys are received within the first and the second key slots, and wherein the first and the second keys physically interfere with all other non-corresponding first and second key slots to prevent connector mating.

11. The system of claim 10, wherein the plurality of connectors further include a standard exclusion feature to prevent a secure connector from being inserted into a non-secure adapter.

12. The system of claim 10, wherein the plurality of connectors are LC connectors.

13. The system of claim 10, wherein the plurality of adapters are duplex adapters.

14. The system of claim 10, wherein corresponding pluralities of connectors and adapters have matching colors.

15. The system of claim 10, wherein the first and the second keys provide selective mating.

* * * * *